US012604357B2

(12) United States Patent
Wiemann et al.

(10) Patent No.: US 12,604,357 B2
(45) Date of Patent: Apr. 14, 2026

(54) USER EQUIPMENT CONFIGURATION DETERMINATION

(71) Applicant: Telefonaktiebolaget LM Ericsson (publ), Stockholm (SE)

(72) Inventors: Henning Wiemann, Aachen (DE); Linnea Faxén, Linköping (SE); Fredrik Ovesjö, Älvsjö (SE); Tao Cui, Upplands Väsby (SE); Marwa Mamoun Abdelgadir Abdelrahman, Stockholm (SE); Joakim Hellsten, Väderstad (SE); Edward Carlstedt-Duke, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 365 days.

(21) Appl. No.: 18/034,436

(22) PCT Filed: Mar. 11, 2021

(86) PCT No.: PCT/SE2021/050216
§ 371 (c)(1),
(2) Date: Apr. 28, 2023

(87) PCT Pub. No.: WO2022/093087
PCT Pub. Date: May 5, 2022

(65) Prior Publication Data
US 2023/0397285 A1 Dec. 7, 2023

Related U.S. Application Data

(60) Provisional application No. 63/107,845, filed on Oct. 30, 2020.

(51) Int. Cl.
*H04W 72/51* (2023.01)
*H04W 8/22* (2009.01)
(Continued)

(52) U.S. Cl.
CPC ............. *H04W 76/20* (2018.02); *H04W 8/22* (2013.01)

(58) Field of Classification Search
CPC ....... H04W 76/20; H04W 8/22; H04W 72/51; H04W 76/15
See application file for complete search history.

(56) References Cited

U.S. PATENT DOCUMENTS 8,675,583 B2 * 3/2014 Lee .......................... H04L 5/001
370/329
9,615,295 B2 * 4/2017 Kim ................ H04W 36/00695
(Continued)

FOREIGN PATENT DOCUMENTS

EP 3703459 A1 9/2020
WO 2021028892 A1 2/2021

OTHER PUBLICATIONS

Author Unknown, "Technical Specification Group Radio Access Network; NR; User Equipment (UE) radio access capabilities (Release 16)," Technical Specification 38.306, Version 16.2.0, Sep. 2020, 3GPP Organizational Partners, 126 pages.
(Continued)

*Primary Examiner* — Joseph E Dean, Jr.
(74) *Attorney, Agent, or Firm* — Withrow & Terranova, PLLC

(57) ABSTRACT

A method for user equipment, UE, configuration determination for a UE connected in a radio communication network is presented. The method is performed in a base station, BS, and comprises determining a minimum candidate user equipment configuration, CUEC, wherein the CUEC comprises a special cell, SpCell, the SpCell providing connection with the UE, validating the determined minimum CUEC against capabilities of the UE, selecting a successfully validated determined minimum CUEC as a current CUEC, generating a next CUEC and comparing the
(Continued)

generated next CUEC with the current CUEC, validating the next CUEC against the capabilities of the UE when the next CUEC has a higher weight than the current CUEC, selecting a successfully validated next CUEC as the current CUEC, and configuring the UE in accordance with the current CUEC. A BS, a distributed unit, a computer program and a computer program product for UE configuration determination are also presented.

16 Claims, 4 Drawing Sheets

(51) Int. Cl.
  *H04W 76/15*          (2018.01)
  *H04W 76/20*          (2018.01)

(56)                References Cited

U.S. PATENT DOCUMENTS

| | | |
|---|---|---|
| 10,129,798 B2 | 11/2018 | Dinan |
| 2019/0141695 A1* | 5/2019 | Babaei .............. H04W 56/0045 |
| 2020/0244410 A1 | 7/2020 | Kim et al. |
| 2020/0329415 A1 | 10/2020 | Li et al. |
| 2020/0413431 A1 | 12/2020 | Park et al. |

OTHER PUBLICATIONS

Author Unknown, "Technical Specification Group Radio Access Network; NR; Radio Resource Control (RRC) protocol specification (Release 16)," Technical Specification 38.331, Version 16.2.0, Sep. 2020, 3GPP Organizational Partners, 3GPP Organizational Partners, 921 pages.
LG Electronics, "R2-1908233: Addition of missing UE capabilities and miscellaneous corrections," 3GPP TSG- RAN WG2 Meeting #106, May 13-17, 2019, Reno, Nevada, 43 pages.
International Search Report and Written Opinion for International Patent Application No. PCT/SE2021/050216, mailed Jun. 7, 2023, 12 pages.
Extended European Search Report for European Patent Application No. 21887034.3, mailed Aug. 22, 2024, 8 pages.

* cited by examiner

USER EQUIPMENT CONFIGURATION DETERMINATION

This application is a 35 U.S.C. § 371 national phase filing of International Application No. PCT/SE2021/050216, filed Mar. 11, 2021, which claims the benefit of provisional patent application Ser. No. 63/107,845, filed Oct. 30, 2020, the disclosures of which are incorporated herein by reference in their entireties.

TECHNICAL FIELD

The present disclosure relates to methods, distributed unit, control unit, computer programs, and computer program product for user equipment configuration determination.

BACKGROUND

In new radio (NR) and long-term evolution (LTE) of the third generation partnership project (3GPP) a user equipment (UE) informs a network (NW) about its capabilities. I.e. the UE informs the NW which features and functions it supports. The NW must take those capabilities and its own NW configuration into account when deciding how to configure the UE, i.e., which features to use. The UE capabilities determine e.g. what band combinations and carrier aggregation configurations that are supported, the number of supported multiple input multiple output (MIMO) layers and modulation order, supported subcarrier spacings, carrier bandwidths, etc. However, there are many more capabilities, especially in the physical layer area. The large amount of UE capabilities for NR are signalled via the radio resource control (RRC) protocol (see 3GPP technical specification (TS) 38.331, NR RRC protocol specification, section 6.3.3) and are described in 3GPP TS 38.306, NR UE radio access capabilities. The NW should only configure those features if the UE reports the corresponding capability parameters.

Whether a UE supports a certain feature depends in many cases on which other features the NW decides to configure. This is especially the case when multiple serving cells are configured for carrier aggregation since the UE baseband processing capability is often dependent on the aggregated bandwidth for transmission/reception in UE. For example, a UE may support feature A only if feature B is not used and vice versa. Hence, a NW that is equipped to use "Feature A" cannot simply validate whether the UE supports "Feature A" as well. The NW must validate the support of feature A in combination with the support of other features that the NW might want to use, and the NW should then select a combination of features that it considers beneficial for the UE.

In this context a feature could e.g. be a serving cell on a certain frequency band, a bandwidth of a serving cell, a subcarrier spacing of a serving cell, a number of downlink (DL) MIMO layers used on a serving cell, a number of uplink (UL) MIMO layers used on a serving cell, and a channel state information reference signal (CSI-RS) configuration.

The UE capabilities that an NR UE advertises to the NW could, depending on the features available in the NW, allow for literally millions of different UE configurations. The selection of a preferred UE configuration should further be taken within a very short period of time (at most a few ms).

Solving this combinatoric problem within the extremely short time is obviously a challenge. The problem becomes even more difficult to solve when conditions such as cells load and channel quality change over time and for different UEs.

SUMMARY

One objective is to determine a user equipment configuration in a radio communication network.

According to a first aspect there is presented a method for user equipment, UE, configuration determination for a UE connected in a radio communication network. The method is performed in a base station, BS, and comprises determining a minimum candidate user equipment configuration, CUEC, wherein the CUEC comprises a special cell, SpCell, the SpCell providing connection with the UE, validating the determined minimum CUEC against capabilities of the UE, selecting a successfully validated determined minimum CUEC as a current CUEC, generating a next CUEC and comparing the generated next CUEC with the current CUEC, validating the next CUEC against the capabilities of the UE when the next CUEC has a higher weight than the current CUEC, selecting a successfully validated next CUEC as the current CUEC, and configuring the UE in accordance with the current CUEC.

By only validating some of the possible CUECs of the BS, the ones having a higher weight than the current CUEC, an effective determination of a validated UE configuration is achieved.

The SpCell may be a primary cell, PCell, or a primary cell in a secondary cell group, PSCell.

The SpCell in the minimum CUEC may use a minimum number of downlink, DL, and uplink, UL, multiple input multiple output, MIMO, layers supported by the SpCell.

The generating a next CUEC may comprise adding one of cells available for carrier aggregation with the SpCell as downlink SCell to the current CUEC. The adding an available cell may add a cell that is contiguous in frequency domain to a serving cell in the current CUEC. The adding an available cell may add one with a highest weight of the available cells.

The generating a next CUEC may further comprise adding a DL MIMO layer to a serving cell in the current CUEC.

The generating a next CUEC may further comprise configuring DL SCell in the current CUEC with UL. The generating a next CUEC may further comprise adding an UL MIMO layer to an UL serving cell in the current CUEC.

A weight of a next CUEC may be compared with a weight of the current CUEC.

The method may be terminated early with the configuring the UE in accordance with the current CUEC when a timer has timed out.

The method may be terminated early with the configuring the UE in accordance with the current CUEC when a number of the validation of the next CUEC have occurred.

The method may be performed in a distributed unit, DU.

The SpCell may support UL and DL control channels with the UE.

Each CUEC may be supported by the BS.

The weight of a CUEC may be the sum of the weights of the serving cells of that CUEC.

The weight of a serving cell may be an estimation of a data rate that a UE configured with that serving cell may obtain.

The weight of each CUEC may be determined by one or more of an estimation of maximum data rate, cell load, and channel quality.

According to a second aspect there is presented a BS for UE configuration determination for a UE connected in a radio communication network. The BS comprises a processing circuitry and a computer program product storing instructions that, when executed by the processing circuitry, causes the BS to determine a minimum candidate user equipment configuration, CUEC, wherein the CUEC comprises a special cell, SpCell, the SpCell providing connection with the UE, validate the determined minimum CUEC against capabilities of the UE, select a successfully validated determined minimum CUEC as a current CUEC, generate a next CUEC and compare the generated next CUEC with the current CUEC, validate the next CUEC against the capabilities of the UE when the next CUEC has a higher weight than the current CUEC, select a successfully validated next CUEC as the current CUEC, and to configure the UE in accordance with the current CUEC.

According to a third aspect there is presented a DU for UE configuration determination for a UE connected in a radio communication network. The DU comprises a processing circuitry and a computer program product storing instructions that, when executed by the processing circuitry, causes the DU to determine a minimum CUEC, wherein the CUEC comprises an SpCell, the SpCell providing connection with the UE, validate the determined minimum CUEC against capabilities of the UE, select a successfully validated determined minimum CUEC as a current CUEC, generate a next CUEC and compare the generated next CUEC with the current CUEC, validate the next CUEC against the capabilities of the UE when the next CUEC has a higher weight than the current CUEC, select a successfully validated next CUEC as the current CUEC, and configure the UE in accordance with the current CUEC.

According to a fourth aspect there is presented a computer program for UE configuration determination for a UE connected in a radio communication network. The computer program comprises computer program code which, when run in a BS, causes the BS to determine a minimum CUEC, wherein the CUEC comprises an SpCell, the SpCell providing connection with for the UE, validate the determined minimum CUEC against capabilities of the UE, select a successfully validated determined minimum CUEC as a current CUEC, generate a next CUEC and compare the generated next CUEC with the current CUEC, validate the next CUEC against the capabilities of the UE when the next CUEC has a higher weight than the current CUEC, select a successfully validated next CUEC as the current CUEC, and configure the UE in accordance with the current CUEC.

A computer program product comprising a computer program and a computer readable storage means on which the computer program is stored is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

A determination of a most preferred configuration for a user equipment (UE) in a radio communication network is presented, which configuration is compliant with the capabilities of the UE.

Candidate UE configurations (CUECs) are built, which are blueprints for ways how the network, based on its own configuration, could configure the UE for the communication with the radio communication network. The CUEC comprises one or more serving cells providing connection with the UE. One of those serving cells is a special cell (SpCell). The remaining cells, if any, are secondary serving cells (SCells). The usefulness for the UE of each CUEC is determined, and only some of the CUECs are validated against the UE capabilities to check whether such configuration would be allowed for the given UE. The configuration which is most useful and which the UE supports is then used.

This process is made efficient by separately creating CUECs and determining their usefulness by comparing a weight of the candidate to find the best configuration. A CUEC that has a higher weight than the best successfully validated configuration so far is also validated against the UE capabilities.

This split simplifies and accelerates implementation and further allows to evolve the CUEC generation function without having to modify the UE capability validation function.

It is possible to determine a CUEC that does not only lead to optimal throughput for the given UE but also to an optimized system capacity and that can integrate functions such as load balancing, which traditionally is done separately from the UE configuration selection. This is possible by comparing metrics such as channel quality or cell load when determining a weight of a CUEC.

Figure 1:
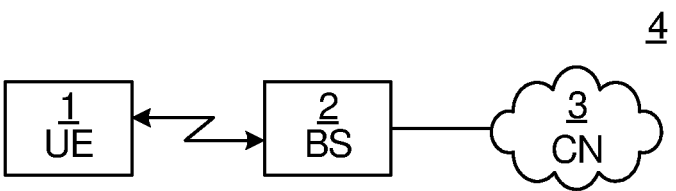
FIG. 1 is a diagram schematically illustrating an environment wherein embodiments presented herein can be implemented.

An environment wherein embodiments presented herein can be implemented is presented with reference to FIG. 1. A UE 1 is in connectivity with a base station 2. The base station 2 is in turn connected to a core network 3. The environment is a radio communication network 4 that is 3GPP compliant. The base station 2 may be a gNB.

Figure 2:
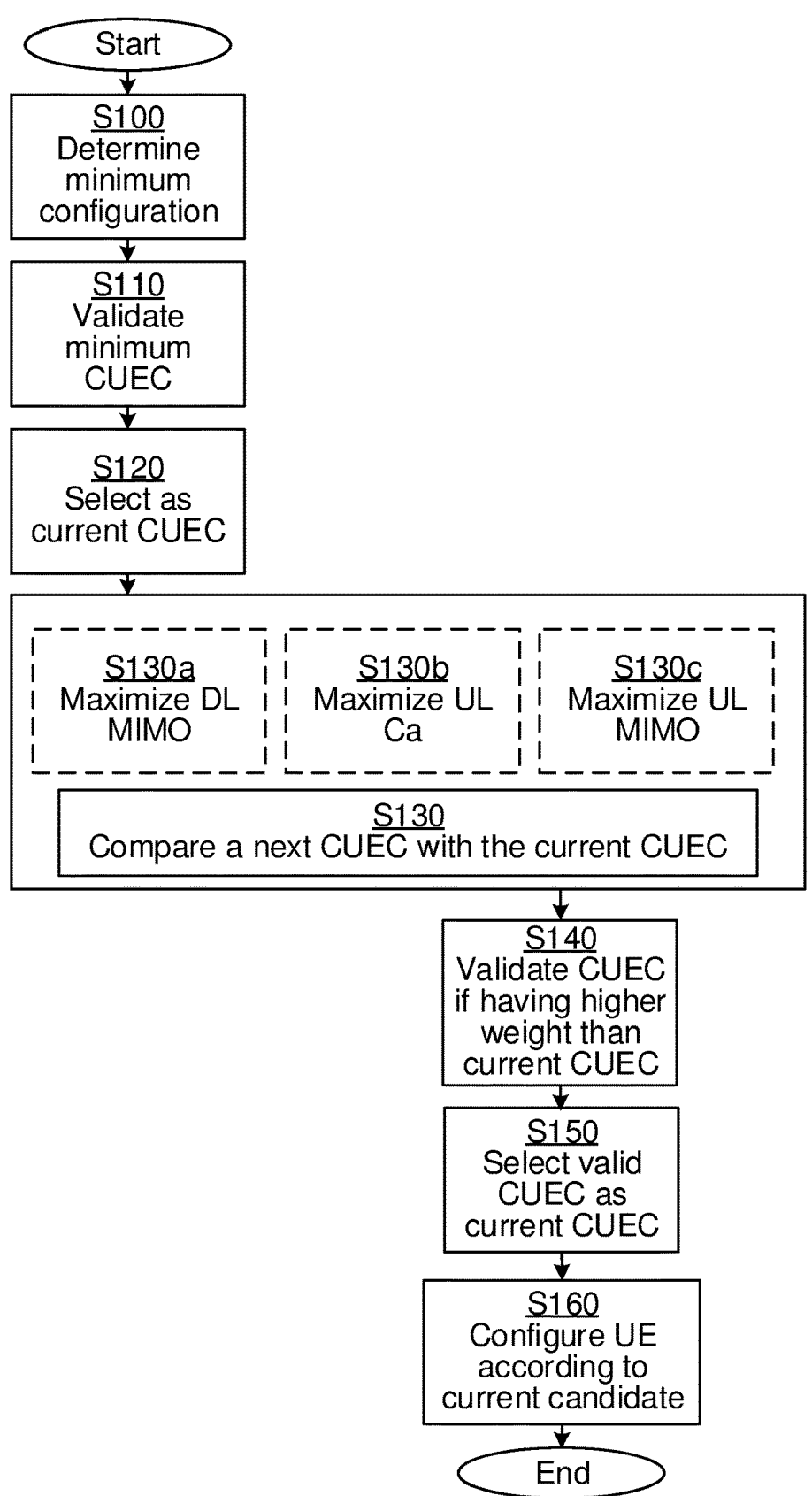

According to an aspect, an embodiment of a method for UE configuration determination for a UE connected to a radio communication network is presented with reference to FIG. 2. The method is performed in a base station (BS). The method may be performed in a distributed unit (DU), a control unit (CU), or a combination of the DU and CU of the BS. In processing block S100 a minimum CUEC is determined, comprising of an SpCell only. In processing block S110 validation of the determined minimum CUEC against the capabilities of the UE is performed. In processing block S120 a successfully validated determined minimum CUEC is selected as a current CUEC. In processing block S130 a next CUEC is generated and compared with the current CUEC. In processing block S140 the next CUEC is validated when the next CUEC has a higher weight than the current CUEC. In processing block S150 a successfully validated next CUEC is selected as the current CUEC, i.e. replacing one previously selected as current CUEC. In processing block S160 the UE is configured in accordance with the current CUEC. When the next CUEC not has a higher weight than the current CUEC, processing blocks S140 and 150 are skipped.

The SpCell may be a primary cell (PCell) or a primary cell in a secondary cell group (PSCell).

The SpCell in the minimum CUEC may use a minimum number of downlink (DL) and uplink (UL) multiple input multiple output (MIMO) layers supported by the SpCell.

Processing block S130 may optionally, in processing block S130a, further generate a next CUEC by adding one of the cells available for carrier aggregation with the SpCell as DL SCell to the current CUEC. The adding of an available cell may be adding a cell that is contiguous in frequency domain to a serving cell in the current CUEC. The adding of an available cell may add one with the highest weight of the available cells.

In optional processing block S130b the generating a next CUEC may further comprise configuring one or more DL SCell in the current CUEC with uplink, to maximize the uplink data rate achievable by the UE. In optional processing block S130c the generating a next CUEC may further comprise adding one or more UL MIMO layers to an UL serving cell in the current CUEC, to maximize UL MIMO.

A weight of a next CUEC may be compared with a weight of the current CUEC.

Processing block S130 may be repeated multiple times by generating and comparing another next CUEC, followed by processing blocks S140 and S150.

The method may be terminated early with processing block S160 when a timer has timed out, and the UE will then be configured in accordance with the current CUEC. Alternatively, the method may be terminated early with processing block S160 when a number of validations in processing block S140 have occurred, and the UE will then be configured in accordance with the current CUEC.

The method may be performed in a distributed unit (DU).

The SpCell may support UL and DL control channels with the UE.

Each CUEC may be supported by the BS.

The weight of a CUEC may be the sum of the weights of the serving cells of that CUEC.

The weight of a serving cell may be an estimation of a data rate that a UE configured with that serving cell may obtain.

The weight of each CUEC may be determined by one or more of an estimation of maximum data rate, cell load, and channel quality.

The presented method attempts to find among all cells of a gNB the best, or most useful, set of serving cells and the best set of configuration parameters for those cells that the UE supports according to its UE capabilities. To assess which set of cells is best, a weight is determined for each serving cell. The weight may be an estimate of the data rate that the UE could achieve thereon. At least static cell parameters, such as bandwidth and the maximum number of MIMO layers, may be taken into account. In addition, the UE's channel conditions and the cell load may be reflected whenever those parameters are available to the gNB.

The actual configuration of a UE may be done by the RRC protocol. ASN.1 signalling in RRC messages (RRCSetup, RRCReconfiguration) may primarily be structured so that a UE is configured with one or more serving cells. For each of those serving cells the network provides a large number of possible configuration parameters.

Two CUECs could differ in terms of the number of serving cells therein. They could also have the same number of serving cells but one or more cell may be in different bands or at different frequency domain positions in the same band. They could also have exactly the same cells but differ in the number of DL and/or UL MIMO layers being configured therein.

A CUEC may comprise a data structure with cells and in which bands and with which parameters a UE could be configured with, according to the network.

One such CUEC data structure is used at a time as input to check whether the UE supports being configured with the combination of those cells and features. If the UE supports the CUEC, the CUEC was successfully validated. If not, another may be tested.

Testing of all possible permutations of parameters would consume far too much time. Even further, the number of CUECs that are validated against UE capabilities should be kept to a minimum.

According to an embodiment, generation and validation of CUECs may be performed in the following order:

Check whether a UE supports a CUEC with a given SpCell using a minimum number of DL- and UL MIMO layers.

Attempt to add DL SCells to the CUEC.

Attempt to increase the DL-MIMO layers for all serving cells in the CUEC.

Attempt to configure the DL SCells with UL.

Attempt to increase the UL-MIMO layers for all serving cells in the CUEC that have UL configured.

Generation and validation of available cells are exemplified in the following. The minimum CUEC only comprises SpCell #7, of available cells #0-13.

A next CUEC is generated by taking the current CUEC [7]) and adding one of the remaining cells [0 . . . 6] & [8 . . . 13] to it. More precisely, the remaining cells [0 . . . 6] & [8 . . . 13] are sorted by contiguity to cells already in the current CUEC and secondly by weight (DL data rate in this example, wherein they have all the same bandwidth). Here #6 and #8 are contiguous to #7, and #6 has the highest weight. The other cells get lower weight. The next CUEC thus now comprises the cells [6, 7]. This next CUEC has in this example a higher weight than the current CUEC. Hence, this next CUEC is validated against the capabilities of the UE and is in this example found to be supported by this UE. This next CUEC is hence promoted to become the new current CUEC.

A new next CUEC is generated, now with the current CUEC ([6, 7]) and with remaining available cells [0 . . . 5] & [8 . . . 13]. Those remaining cells are again sorted by contiguity (5 & 8) and by weight. In this example the resulting next CUEC [5, 6, 7] has again higher weight than the current CUEC [6, 7]. Hence, it is validated against the capabilities of the UE and it is found to be supported. Hence, it becomes the new current CUEC.

In a next step the next CUEC comprises of [4, 5, 6, 7], which is also better than the current CUEC [5, 6, 7]. However, the capability validation says that the UE does not support this next CUEC. Another next CUEC is generated by adding instead cell 8 to the current CUEC. However, also this next CUEC is not supported by the UE capabilities.

A next CUEC is generated by adding cell #0, which is not contiguous to any of the cells in the current CUEC. This next CUEC with [0][5, 6, 7] has a higher weight than the current CUEC and is validated against the capabilities of the UE. The validator indicates that the UE supports this configuration, and this next CUEC is selected to take the place as the current CUEC.

In this example, the process is now terminated early, either due to the number of validations performed, or due to a timer having timed out, and the UE is configured with the latest current CUEC.

Figure 3:
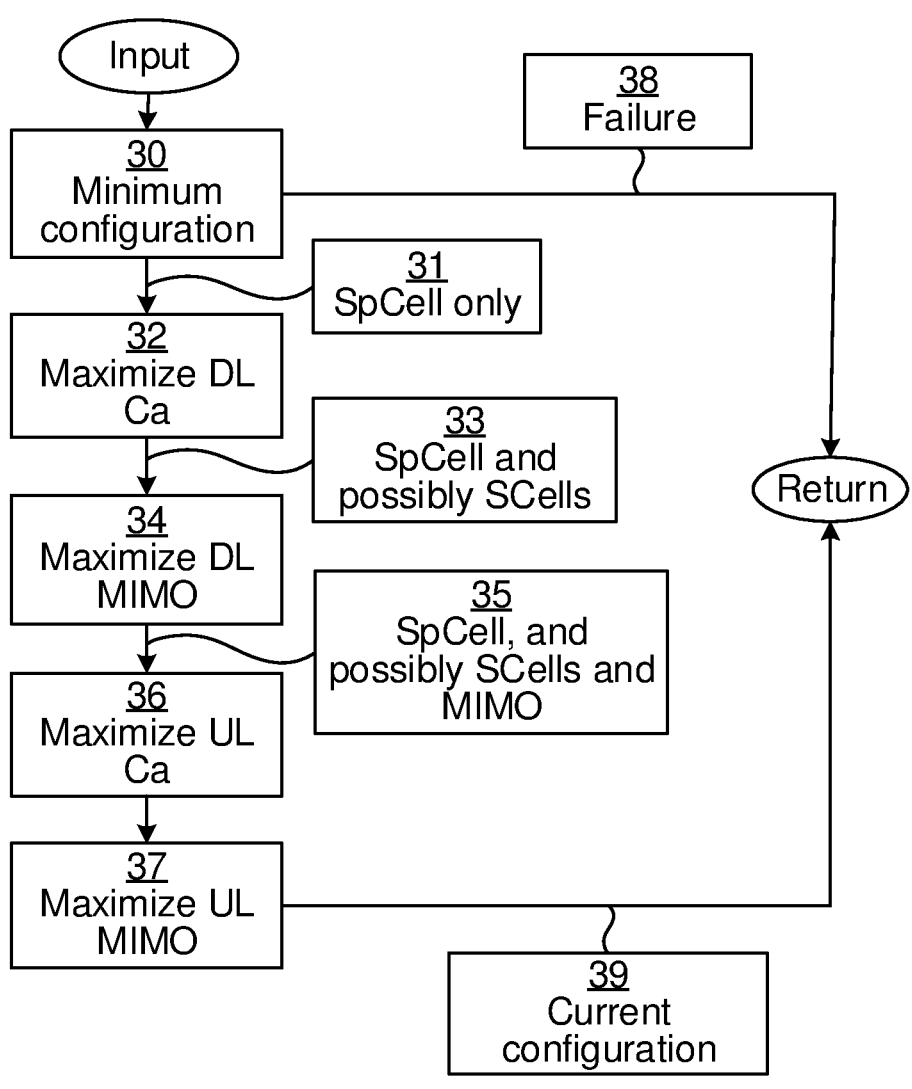
FIGS. 2-4 are flowcharts schematically illustrating embodiments of methods presented herein.

An embodiment of a method for UE configuration determination for a UE connected to a radio communication network is presented with reference to FIG. 3.

In this embodiment a CUEC is compared with the current configuration found so far (if any) and is thereafter validated against the capabilities of the UE if the comparison showed a higher weight.

The process is performed in a base station and is split into five sub-procedures.

In the first sub-process 30, with SpCell and SCell(s) as input, a minimum CUEC is determined. The minimum CUEC is set to gNB configuration with minimum DL/UL MIMO layers. A validation is made weather the UE supports the minimum CUEC with the given SpCell using the minimum number of DL and UL MIMO layers or not. When successfully validated, the minimum CUEC is selected 31 as the current CUEC, i.e. in view of the SpCell only. If the minimum CUEC is not successfully validated, the UE is rejected or released, since the UE could not be configured with this SpCell even in minimum CUEC. When the process is run in a DU gNB the failure is returned to a CU.

In the second sub-process 32 DL carrier aggregation (CA) is maximized. A CUEC is made up by a candidate SCell with minimum number of DL MIMO layers as supported by the gNB. Each CUEC supported by the gNB is compared with the current configuration, and when determined more useful (i.e. having a higher weight), a validation is obtained for that CUEC. A successfully validated CUEC will be selected 33 as the current CUEC, replacing the previously selected CUEC. In case no CUEC is successfully validated in the second sub-process, the current CUEC for the third sub-process will be the same as the output from the first sub-process.

In the third sub-process 34 DL MIMO layers are maximized. Each CUEC supported by the gNB is compared with the current CUEC, and when determined more useful (i.e. having a higher weight), a validation is obtained for that CUEC. A successfully validated CUEC will be selected 35 as the current CUEC, replacing the CUEC previously selected as current CUEC. In case no CUEC is successfully validated in the third sub-process, the current CUEC for the fourth sub-process will be the same as the output from the second sub-process.

In the fourth sub-process 36 DL SCells are maximized with UL CA. Each CUEC supported by the gNB is compared with the current CUEC, and when determined more useful (i.e. having a higher weight), a validation is obtained for that CUEC. A successfully validated CUEC will be selected as the current CUEC, replacing the previously selected CUEC. In case no CUEC is successfully validated in the fourth sub-process, the current CUEC for the fifth sub-process will be the same as the output from the third sub-process.

In the fifth sub-process 37 UL MIMO layers are maximized. Each CUEC supported by the gNB is compared with the current CUEC, and when determined more useful (i.e. having a higher weight), a validation is obtained for that CUEC. A successfully validated CUEC will be selected as the current CUEC, replacing the previously selected CUEC. The current CUEC will thus be current configuration 39. In case no CUEC is successfully validated in the fifth sub-process, the current CUEC from the fourth sub-process will be returned. The returned current CUEC will thus comprise at least the SpCell and possibly DL and/or DL and UL SCells.

The process is performed in the order described. An early termination may however be triggered during the process, and the current CUEC will then be returned.

Figure 4:
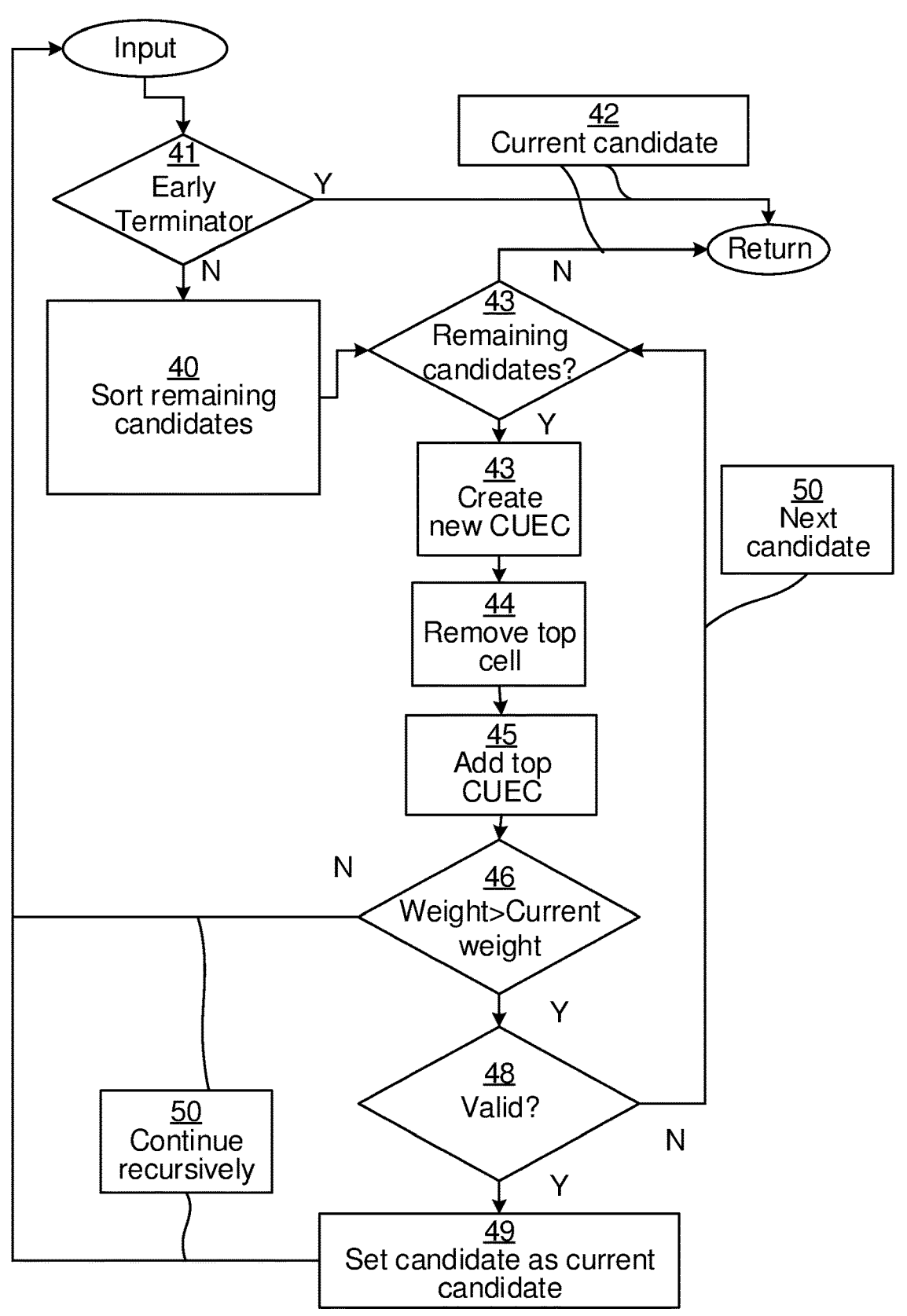

An embodiment of a method for UE configuration determination for a UE connected to a first cell in a radio communication network is presented with reference to FIG. 4.

In this embodiment the second sub-process described above is in the process alternatively configured in the following recursive way. The CUECs supported by the gNB, comprising different sets of serving cells, is determined.

A function is configured to take a set of candidate serving cells as input. The initial input is the remaining candidates, a base configuration, and the current configuration. The remaining candidates are the CUECs supported by the gNB. The base configuration is the validated minimum CUEC. The current configuration is the current CUEC. The function is then called recursively. As a first step in each recursion level the method re-sorts remaining candidate cells. This provides a sorted list containing:

the serving cells that are contiguous with any of the cells in the base configuration and that have at least one contiguous carrier which is not yet in the base configuration, are added first in the list, secondly the remaining serving cells are added in order of decreasing cell weight.

This sorting is particularly important in case there is not enough time to test all possible CUECs. An early termination may be triggered anytime during the process.

The prioritization of listing contiguous cells first provides for not testing all possible permutations of cells while ensuring that contiguous blocks of serving cells are found. Specifically, it allows not passing a candidate cell to a deeper recursion level of this method if the candidate wasn't supported on the higher level.

Contiguous cells which do not have another contiguous neighbour do not need to be prioritized. The reason is that those cells at the edge of a contiguous set of carriers do not bear the risk to break a contiguous set of carriers into two. Hence, these carriers should be sorted only based on their weight. In a mixed bandwidth scenario where the serving cells with narrower bandwidth are typically at the edge of a block of contiguous carriers, selecting e.g. a non-contiguous 100 MHz carrier before selecting a 50 MHz carrier is possible. This maximizes the weight of the overall configuration if the UE capabilities do not allow configuring the UE with all candidate serving cells (e.g. only 4 out of 8).

Detailed steps of the procedure:

The input remaining candidates are sorted 40 by contiguity and weight.

The early terminator 41 is optional. When used, the second sub-process ends if triggered, and the current CUEC is returned 42 to the process.

The sub-process ends 43 if there are no more candidates, and the current CUEC is returned 42 to the process.

New CUECs are created 44 by copying the base configuration.

The highest ranked, i.e. top, cell of the remaining candidates is removed 45.

The top candidate is added 46 to the new CUEC.

When 47 the weight of this new CUEC is higher than the weight of the current CUEC the second sub-process obtains validation 48 of whether the UE supports the new CUEC or not.

If the UE supports the new CUEC, it is stored 49 to replace the current CUEC. Alternatively, when the UE does not support the new CUEC, the second sub-process continues with the next cell 50 in the sorted list of candidate cells 43. The unsuccessfully added cell is implicitly removed by creating a new copy of the given base configuration.

Alternatively, when 46 the weight of the current CUEC isn't higher than the weight of the current candidate cell sets or when 49 the CUEC became the current CUEC, the second sub-process calls itself recursively 50. In this call it sets the remaining sorted candidate cells as candidates for a deeper recursion level. The current CUEC is set as base configuration.

The second sub-process returns to the previous (higher) recursion level where it may add other candidates instead of the candidates added in the branch it just left.

The current CUEC 42 is returned whether all candidates have been tested or whether the process is terminated early.

Interleaved selection of different features

The second sub-process is configured to maximize the number of serving cells before maximizing the number of MIMO layers used on those serving cells.

However, a UE may indicate in its capabilities that it supports either few serving cells with many MIMO layers or more cells with fewer MIMO layers. In such cases, possibly depending also on the bandwidth, channel quality and cell load of the candidate serving cells, a configuration with fewer cells but more MIMO layers may have the highest weight.

The addition of DL cells and MIMO layers may then instead be interleaved rather than sequential. For example, the third sub-process using maximized DL MIMO may be called from within the second sub-process utilising maximized DL CA whenever the latter found a new current CUEC. In this case, the third sub-process should only validate a CUEC against the UE capabilities if the weight of the CUEC is higher than the weight of the current CUEC, as this will greatly reduce the number of validations.

The term weight is used herein to define a value of how useful a given configuration or a feature is. Some examples of how such weights can be determined is presented. Nevertheless, other factors may be chosen, or the factors may be weighted differently for more usefulness. Thereby it is possible to value a certain feature higher or lower compared to other features and thereby make it more or less likely that the selection algorithm chooses those features (instead of others).

Weight of a Cell

A weight for each candidate serving cell is determined herein. This may be an integer value that describes the value or benefit that this cell would have for the UE if it was added as a serving cell to the CUEC. The weight of a cell may be an approximation of the maximum data rate (e.g. in kbit/s) that a UE could achieve in that cell. The data rate that is achievable in each cell depends primarily on the carrier bandwidth, the maximum number of MIMO layers and the maximum modulation scheme. A formula to determine a peak rate can be found in 3GPP TS 38.306, section 4.1.2.

Cell Load

The throughput that a UE may actually achieve on a given cell depends however also on the load of that cell. If many UEs compete for the resources of the cell, each UE will typically get only a fraction of the resources of the cell. To account for this in the serving cell selection, the weight of a cell may take the cell load into account.

A metric for the cell load is the moving average of the number of active UEs that compete for the resources in each slot, primarily the DL resources. The weight, i.e. peak data rate, may be multiplied by the following factor to obtain a more realistic weight (data rate) that the UE may observe when being configured with this cell: weight=weight*(1/(number of simultaneous active UEs with data in queue+1))

Channel Quality

The data rate that a UE can achieve on a serving cell further depends on the channel quality. While a carrier with wider bandwidth usually has a high peak data rate and often also a low load, the actual throughput thereon may be low if the UE is in bad coverage. In such cases a narrower carrier in a low frequency band might have been better to choose.

To ensure that the cell weight reflects the actual channel quality, the weight (data rate) may be multiplied with a channel quality factor in the range [0 . . . 1], where 1 represents channel quality conditions in which the UE can likely be scheduled with its peak data rate (highest possible modulation and coding scheme). Such a channel quality factor may be derived from channel quality measurements that the UE provides to the network. If such measurements are not available, the network may use an estimate derived e.g. from measurements on another carrier frequency and from known cell overlaps.

Weight of a CUEC

The weight of a CUEC may then be the sum of the weights of the serving cells therein. While the sum of the cell weights is intuitive for downlink serving cells, other schemes may be applied.

An embodiment of a method for determining a preferred configuration for a UE that is supported according to the UE capabilities indicated by the UE is presented. A set of one or more CUEC is generated, and a weight (usefulness) of the CUECs are determined. Only some of the CUECs are validated against the UE capabilities. A best configuration with the highest weight is selected among the subset of successfully validated CUCEs.

The step of generating CUECs may comprise using different subsets of the available DL cells that the network operates on.

The step of generating CUECs may comprise generating configurations that are supported by the network configuration, licenses, implementation restrictions or configured policies.

A new CUEC may be derived from another configuration by adding further available cells in decreasing order of their weight.

A new CUEC may be derived from another configuration by adding cells that are contiguous to the cells in the latter if such are available and by adding cells in decreasing order of their weight, otherwise.

The generation of CUECs with different subsets of the available cells may be done recursively.

Generating CUECs may comprise generating configurations that use different number of downlink MIMO layers for the chosen DL serving cells.

Generating CUECs may comprise generating configurations that use different CSI-RS configurations for the chosen DL serving cells.

Generating CUECs may comprise generating configurations that use different subsets of the chosen DL serving cells also as uplink serving cells.

Generating CUECs may comprise generating configurations that use different number of uplink MIMO layers for the chosen uplink serving cells.

Generating CUECs may be terminated early, i.e. before having evaluated all possible configuration options, after a predetermined time or after having generated a pre-determined number of configurations or after having validated a pre-determined number of configurations.

The weight of a CUEC may be derived at least from the peak downlink data rate that a UE could achieve on the downlink serving cells in that CUEC.

The weight of a CUEC may be derived at least from the peak uplink data rate that a UE could achieve on the uplink serving cells in that CUEC.

The weight of a CUEC may be derived at least from combination of the peak UL and DL data rate with a defined ratio that a UE could achieve on the serving cells in that CUEC.

The weight of a CUEC may be derived by taking channel quality estimates or channel quality measurements into account.

The weight of a CUEC may be derived by taking the load of the cells into account.

Validation of CUECs may validate whether the UE supports, according to its capabilities, the number of downlink and uplink serving cells including their channel bandwidths, subcarrier spacings and MIMO layers of a configuration.

Validation of CUECs may validate only those candidate configurations having a value that is higher than the successfully validated CUECs with the highest value so far.

Figure 5:
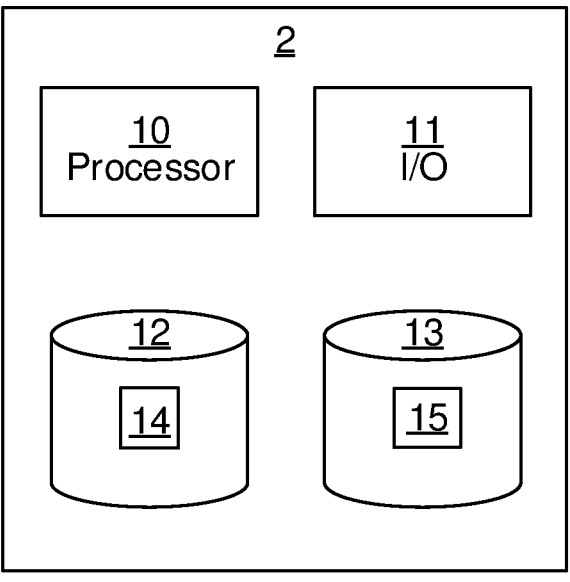
FIG. 5 is a diagram schematically illustrating some components of devices presented herein.

According to an aspect, an embodiment of a BS 2 for UE configuration determination for a UE 1 connected in a radio communication network is presented with reference to FIG. 5. The BS 2 comprises a processing circuitry 10 and a computer program product 12, 13 storing instructions 14, 15 that, when executed by the processing circuitry, causes the BS 2 to determine a minimum CUEC. The CUEC comprises an SpCell. The SpCell provides connection with the UE. The BS is further caused to validate the determined minimum CUEC against the capabilities of the UE, select a successfully validated determined minimum CUEC as a current CUEC, generate a next CUEC and compare the generated next CUEC with the current CUEC, validate the next CUEC against the capabilities of the UE when the next CUEC has a higher weight than the current CUEC, select a successfully validated next CUEC as the current CUEC, and to configure the UE in accordance with the current CUEC.

FIG. 5 is a schematic diagram showing some components of the BS 2. The processing circuitry 10 may be provided using any combination of one or more of a suitable central processing unit, CPU, multiprocessing circuitry, microcontroller, digital signal processing circuitry, DSP, application specific integrated circuit etc., capable of executing software instructions of a computer program 14 stored in a memory. The memory can thus be considered to be or form part of the computer program product 12. The processing circuitry 10 may be configured to execute methods described herein with reference to FIGS. 2-4.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the BS 2.

The BS 2 may further comprise an input/output (I/O) interface 11 including e.g. a user interface. The BS 2 may further comprise a receiver configured to receive signalling from other nodes, and a transmitter configured to transmit signalling to other nodes (not illustrated). Other components of the BS 2 are omitted in order not to obscure the concepts presented herein.

Figure 6:
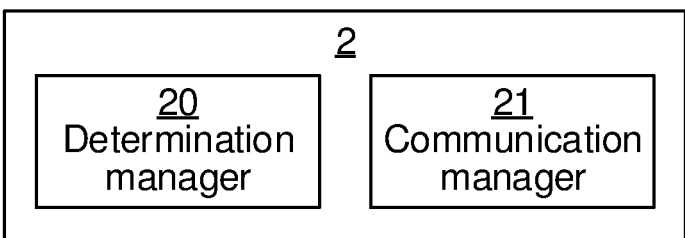
FIG. 6 is a diagram schematically illustrating functional modules components of devices presented herein.

FIG. 6 is a schematic diagram showing functional blocks of the BS 2. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the process blocks in the method illustrated in FIGS. 2-4, comprising a determination manager unit 20, and a communication manager unit 21. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manager 20 is for UE configuration determination for a UE connected to a first cell in a radio communication network. This module corresponds to the processing blocks S100-S150 of FIG. 2. This module can e.g. be implemented by the processing circuitry 10 of FIG. 5, when running the computer program.

The communication manager 21 is for UE configuration determination for a UE connected to a first cell in a radio communication network. This module corresponds to the processing block S160 of FIG. 2. This module can e.g. be implemented by the processing circuitry 10 of FIG. 5, when running the computer program.

The determination may be configured in a DU of the BS, in a CU of the BS or in a combination of the DU and CU.

According to an aspect, an embodiment of a DU 2 for UE configuration determination for a UE 1 connected in a radio communication network is presented with reference to FIG. 5. The DU 2 comprises a processing circuitry 10 and a computer program product 12, 13 storing instructions 14, 15 that, when executed by the processing circuitry, causes the DU 2 to determine a minimum CUEC. The CUEC comprises an SpCell. The DU is further caused to validate the determined minimum CUEC against capabilities of the UE, select a successfully validated determined minimum CUEC as a current CUEC, generate a next CUEC and compare the generated next CUEC with the current CUEC, validate the next CUEC against the capabilities of the UE when the next CUEC has a higher weight than the current CUEC; select a successfully validated next CUEC as the current CUEC, and to configure the UE in accordance with the current CUEC.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended claims.

The invention claimed is:

1. A method for user equipment, UE, configuration determination for a UE connected in a radio communication network, the method being performed in a base station, BS, and comprising:

determining a minimum candidate user equipment configuration, CUEC, wherein the CUEC comprises a special cell, SpCell, the SpCell providing connection with the UE, wherein the SpCell is a primary cell, PCell, or a primary cell in a secondary cell group, PSCell, and wherein the SpCell in the minimum CUEC uses a minimum number of downlink, DL, and uplink, UL, multiple input multiple output, MIMO, layers supported by the SpCell;

validating the determined minimum CUEC against capabilities of the UE;

selecting a successfully validated determined minimum CUEC as a current CUEC;

generating a next CUEC and comparing the generated next CUEC with the current CUEC;

validating the next CUEC against the capabilities of the UE when the next CUEC has a higher weight than the current CUEC, wherein the weight of each CUEC is determined by one or more of an estimation of maximum data rate, cell load, and channel quality;

selecting a successfully validated next CUEC as the current CUEC; and configuring the UE in accordance with the current CUEC.

2. The method according to claim 1, wherein the generating a next CUEC comprises adding one of cells available for carrier aggregation with the SpCell as downlink SCell to the current CUEC.

3. The method according to claim 2, wherein the adding of an available cell adds a cell that is contiguous in frequency domain to a serving cell in the current CUEC.

4. The method according to claim 2, wherein the adding of an available cell adds one with a highest weight of the available cells.

5. The method according to claim 1, wherein the generating a next CUEC further comprises adding a DL MIMO layer to a serving cell in the current CUEC.

6. The method according to claim 1, wherein the generating a next CUEC further comprises configuring a DL SCell in the current CUEC with UL.

7. The method according to claim 6, wherein the generating a next CUEC further comprises adding an UL MIMO layer to an UL serving cell in the current CUEC.

8. The method according to claim 1, wherein a weight of a next CUEC is compared with a weight of the current CUEC.

9. The method according to claim 1, wherein the method being performed in a distributed unit, DU.

10. The method according to claim 1, wherein the SpCell supports UL and DL control channels with the UE.

11. The method according to claim 1, wherein each CUEC is supported by the BS.

12. The method according to claim 1, wherein the weight of a CUEC is the sum of the weights of the serving cells of that CUEC.

13. The method according to claim 1, wherein the weight of a serving cell is an estimation of a data rate that a UE configured with that serving cell may obtain.

14. A base station for user equipment, UE, configuration determination for a UE connected in a radio communication network, the base station, BS, comprising:

a processing circuitry and a computer program product storing instructions that, when executed by the processing circuitry, causes the BS to:

determine a minimum candidate user equipment configuration, CUEC, wherein the CUEC comprises a special cell, SpCell, the SpCell providing connection with the UE, wherein the SpCell is a primary cell, PCell, or a primary cell in a secondary cell group, PSCell, and wherein the SpCell in the minimum CUEC uses a minimum number of downlink, DL, and uplink, UL, multiple input multiple output, MIMO, layers supported by the SpCell;

validate the determined minimum CUEC against capabilities of the UE;

select a successfully validated determined minimum CUEC as a current CUEC;

generate a next CUEC and compare the generated next CUEC with the current CUEC;

validate the next CUEC against the capabilities of the UE when the next CUEC has a higher weight than the current CUEC, wherein the weight of each CUEC is determined by one or more of an estimation of maximum data rate, cell load, and channel quality;

select a successfully validated next CUEC as the current CUEC; and configure the UE in accordance with the current CUEC.

15. A distributed unit for user equipment, UE, configuration determination for a UE connected in a radio communication network, the distributed unit, DU, comprising:

a processing circuitry and a computer program product storing instructions that, when executed by the processing circuitry, causes the DU to:

determine a minimum candidate user equipment configuration, CUEC, wherein the CUEC comprises a special cell, SpCell, the SpCell providing connection with the UE, wherein the SpCell is a primary cell, PCell, or a primary cell in a secondary cell group, PSCell, and wherein the SpCell in the minimum CUEC uses a minimum number of downlink, DL, and uplink, UL, multiple input multiple output, MIMO, layers supported by the SpCell;

validate the determined minimum CUEC against capabilities of the UE;

select a successfully validated determined minimum CUEC as a current CUEC;

generate a next CUEC and compare the generated next CUEC with the current CUEC;

validate the next CUEC against the capabilities of the UE when the next CUEC has a higher weight than the current CUEC, wherein the weight of each CUEC is determined by one or more of an estimation of maximum data rate, cell load, and channel quality;

select a successfully validated next CUEC as the cur-
rent CUEC; and configure the UE in accordance with the current CUEC.

16. A non-transitory computer readable medium compris-
ing instructions executable by processing circuitry of a base
station for user equipment, UE, configuration determination
for a UE connected in a radio communication network,
whereby the base station is operable to:

determine a minimum candidate user equipment configu-
ration, CUEC, wherein the CUEC comprises a special
cell, SpCell, the SpCell providing connection with for
the UE, wherein the SpCell is a primary cell, PCell, or
a primary cell in a secondary cell group, PSCell, and
wherein the SpCell in the minimum CUEC uses a
minimum number of downlink, DL, and uplink, UL,
multiple input multiple output, MIMO, layers sup-
ported by the SpCell;

validate the determined minimum CUEC against capa-
bilities of the UE;

select a successfully validated determined minimum CUEC as a current CUEC;

generate a next CUEC and compare the generated next
CUEC with the current CUEC;

validate the next CUEC against the capabilities of the UE
when the next CUEC has a higher weight than the
current CUEC, wherein the weight of each CUEC is
determined by one or more of an estimation of maxi-
mum data rate, cell load, and channel quality;

select a successfully validated next CUEC as the current
CUEC; and configure the UE in accordance with the current CUEC.

* * * * *